United States Patent [19]

Klasen et al.

[11] Patent Number: 5,480,626
[45] Date of Patent: Jan. 2, 1996

[54] METHOD FOR PRODUCING SPHERICAL GRANULATED MATERIALS FROM POWERED SOLIDS AND GRANULATED MATERIALS PRODUCED THEREBY

[75] Inventors: Claas-Jürgen Klasen, Rodenbach; Martin Foerster, Büdingen; Andreas Höfler, Alzenau; Klaus-Peter Bauer, Maintal; Herbert Riemenschneider, Gelnhausen; Oliver Franta, Frankfurt; Rainer Gilg, Gründau, all of Germany

[73] Assignee: Degussa Aktiengesellschaft, Frankfurt, Germany

[21] Appl. No.: 151,994

[22] Filed: Nov. 15, 1993

[30] Foreign Application Priority Data

Nov. 14, 1992 [DE] Germany .......................... 42 38 495.8
Oct. 27, 1993 [DE] Germany .......................... 43 36 548.5

[51] Int. Cl.⁶ .............................. C09C 1/58; B29B 9/08
[52] U.S. Cl. .................. 423/449.1; 23/314; 264/118; 264/141; 425/202; 425/331; 425/DIG. 101
[58] Field of Search ...................... 264/117, 118, 264/140–143; 425/314, 331, 310, 202, DIG. 101, DIG. 230; 23/314; 423/449.1

[56] References Cited

U.S. PATENT DOCUMENTS

| | | | |
|---|---|---|---|
| 2,256,949 | 9/1941 | McKinney | 23/314 |
| 2,283,364 | 5/1942 | Hanson et al. | 425/DIG. 101 |
| 2,422,989 | 6/1947 | Skoog | 425/DIG. 101 |
| 2,638,625 | 5/1953 | Studebaker et al. | 425/DIG. 101 |
| 2,771,347 | 11/1956 | Beck et al. | 23/314 |
| 2,834,991 | 5/1958 | Hardman | 425/DIG. 101 |
| 3,287,480 | 11/1966 | Wechsler et al. | 264/118 |
| 3,602,437 | 8/1971 | Driscoll | 241/21 |
| 3,607,086 | 9/1971 | Dingus | 23/314 |
| 3,627,865 | 12/1971 | Wittwer | 264/118 |
| 3,787,161 | 1/1974 | Frye et al. | 425/222 |
| 4,005,170 | 1/1977 | Harris | 23/314 |
| 4,075,156 | 2/1978 | Johnson | 423/449.1 |
| 4,117,065 | 9/1978 | Tsein et al. | 264/118 |
| 4,222,727 | 9/1980 | Adachi et al. | 425/222 |
| 4,228,143 | 10/1980 | Cheng et al. | 423/449.1 |
| 4,238,199 | 12/1980 | Rothbuhr et al. | 23/314 |
| 4,246,251 | 1/1981 | Braddock | 423/449.1 |
| 4,366,139 | 12/1982 | Kuhner et al. | 23/314 |
| 4,374,113 | 2/1983 | Yates et al. | 423/449.1 |
| 4,446,086 | 5/1984 | Molenaar et al. | 264/118 |
| 4,489,132 | 12/1984 | Shimoyama | 23/314 |
| 4,569,834 | 2/1986 | West et al. | 23/314 |
| 4,789,321 | 12/1988 | Dingus | 425/222 |
| 4,980,106 | 12/1990 | Vogel | 264/102 |
| 5,110,576 | 5/1992 | Soeda et al. | 423/449.1 |
| 5,152,215 | 10/1992 | Wetzel | 425/DIG. 230 |
| 5,229,452 | 7/1993 | Green | 423/449.1 |

FOREIGN PATENT DOCUMENTS

| | | |
|---|---|---|
| 0360236 | 3/1990 | European Pat. Off. . |
| 0370490 | 5/1990 | European Pat. Off. . |
| 1224859 | 9/1966 | Germany . |
| 844379 | 7/1981 | U.S.S.R. ............ 425/331 |
| 1253815 | 2/1986 | U.S.S.R. ............ 425/331 |

*Primary Examiner*—Jay H. Woo
*Assistant Examiner*—Duane S. Smith
*Attorney, Agent, or Firm*—Beveridge, DeGrandi, Weilacher & Young

[57] ABSTRACT

A method for the production of spherical granulated materials from powdered solids and the granulated materials produced by it are disclosed. The method is characterized in that the powdered solids are moistened, possibly together with the usual binders, flow agents and plasticizers for the compression of solids, by the addition of a corresponding quantity of liquid and mixing smoothly in a mixer; they are then compressed with a ring collar mill into cylindrical agglomerate and then rounded in a rounding unit with wrinkle washer. The granulated solids thus produced have a very narrow particle size distribution and are distinguished by good flowability and good dispersability, depending on process controls.

23 Claims, 2 Drawing Sheets

METHOD FOR PRODUCING SPHERICAL GRANULATED MATERIALS FROM POWERED SOLIDS AND GRANULATED MATERIALS PRODUCED THEREBY

INTRODUCTION AND BACKGROUND

The present invention pertains to a method for the production of spherical granulated materials from powdered solids and also to the granulated materials produced by this method.

In many industrial realms there is a problem of storing, transporting, and processing of powdered solids. This is often associated with a significant expense since the powdered substances have physical properties that differ from those of pure solids. The technical handling of such materials is improved if they are present in granulated material form. To do this, the powders are usually compressed mechanically with the addition of suitable binders to such an extent that interactive forces are in effect at the surfaces between the individual powder particles in the molecular range. In this case products form with new properties.

Spherical granulated materials are of particular interest. They have improved flow properties compared to finely dispersed bulk material and cylindrical extrudates or tablets; thus they can be metered in, transported and stored at lower cost. In many cases the granulated material solids have to be dispersed again during use, for example in the case of laundry detergents and when using carbon black as a structural enhancer in rubber articles (rubber blacks) or for dyeing of paints and plastics (pigment blacks).

The powdered carbon blacks occurring during production thereof must therefore be granulated in a subsequent process step. In this case, in addition to a small fraction of fines and a narrow particle size distribution, a simple and complete redispersibility of the granules is desirable in spite of their durability (transport stability).

The redispersibility plays an important role for example in applications in the area of paint production, cable compounds and technical rubber articles, since even small fractions of nondispersed carbon black agglomerates can lead to severe deficiencies in the application of the end product to its ultimate uses.

The term "carbon black agglomerates" as used herein means the agglomerates of a number of so-called carbon black aggregates bound together by physical cohesion forces (Van der Waals forces) according to the definitions in DIN (German Industrial Standard) 53206. Carbon black aggregates are produced by solid-phase coalescence of the primary carbon black particles during the carbon black formation process from which carbon black agglomerates form through coalescence of the particles either spontaneously or promoted by a granulation process.

Carbon blacks with a high fraction of voids in the aggregate are called "high structure" carbon blacks; in the case of a small percentage of voids, they are called "low structure" carbon blacks. The dibutyl phthalate absorption method (DBP absorption according to DIN 53601) is used as a measure for the structure of a carbon black.

The carbon black structure in large measure determines the product properties of the paints, plastics or rubber articles dyed or reinforced with it. Therefore, in order not to adversely affect the product properties, the smallest possible break up of the structure by the granulation process is required.

Granulated, powdered solids are also employed as carriers for chemical catalysts and as adsorbents. In this case, by means of the material itself or by addition of suitable binders, it must be assured that the granules do not break apart in use. Good flow properties and metering properties and also a low abrasion are also required here as well.

Various methods for granulation and/or agglomeration of powdered solids are known, for example from Ullmann's Encyclopedia of Industrial Chemistry, Vol. B2, pages 7–15 to 7–21. A distinction is made between spray agglomeration and/or spray drying, coalescence agglomeration and agglomeration by mechanical compacting (press agglomerates). The agglomerates produced in these ways have dimensions in the range of several tenths of a millimeter up to several millimeters, and for purposes of this patent application are designated as granulated materials in order to establish a definite differentiation from the carbon black agglomerates defined according to DIN 53206 that are produced by the spontaneous coalescence of carbon black aggregates and that have dimensions of less than 100 µm.

The granulation of powdered solids is usually carried out with addition of a suitable binder and of a moistening agent which is normally water. The moistening agent must be removed down to a certain residual moisture level after the granulation by means of energy-intensive drying methods. Depending on the end application, a calcination step at elevated temperatures is also needed.

Typical applications of these agglomeration methods are the spray drying of laundry compounds and fodder, and the coalescence agglomeration of carbon black in barbed shaft mixers, plowshare or counter current mixers. The agglomerates and/or granulated materials produced in these ways are not uniformly compacted.

Due to the relatively broad distribution of particle sizes, the flow properties of the loose granulated materials pile is adversely affected. This impedes a precise metering during use. The addition of moistening agents and binders can have negative effects on the redispersibility of the granules.

Roller compactors, matrix presses and extruders are used in the case of agglomeration methods using mechanical compression. The granulated materials and/or agglomerates produced by these machines have a cylindrical shape and have to be rounded off in rounding units to form the spherical shape. Now it turns out that quite different granulated materials qualities are obtained. The diameter distribution of the granulated materials in general has a very broad range, and in addition to the desired spherical granules they also contain tiny fragments that have to be sifted off in an additional process step in order to obtain a dust-free product. The physical properties of these granules, such as homogeneity, fracture resistance, abrasion and redispersibility, exhibit large fluctuations and cannot be matched to each other satisfactorily by known methods.

Extruders produce very homogeneous and highly compressed agglomerate strands, but extruders require a very precise setting of the moisture and kneading time of the powdered solid. Typically the permissible tolerances for the moisture of the infed material is in the range of only 1 to 2%. The investment costs for extruders are high.

As mentioned, in many technical applications it is a matter of producing granulated materials with the best possible fracture strength and small abrasion with simultaneously good redispersibility. These requirements are mutually contradictory and cannot always be completely fulfilled by the known agglomeration and/or granulation methods.

SUMMARY OF THE INVENTION

An object of the present invention is to provide a simple and low-cost method by which spherical granulated materials of homogeneous density can be produced, which have a very narrow diameter size range and are optimized with regard to fracture strength, abrasion and redispersibility. An additional object of the present invention is to provide granulated materials produced by this method from carbon black, pyrogenic silica and laundry compounds.

According to the present invention, the prior art problems can be solved by a method for the production of spherical granulated materials from powdered solids, where a moistening agent, a binder and optionally additional additives are added to the solids in a mixer and they are uniformly moistened, mixed, and then pressed into cylindrical strands with a ring collar mill that has a variable slip between the ring matrix and press roller. Thereafter, the cylindrical strands are shaped into spherical granulated materials. Suitable shaping means such as rounding apparatus with corrugated disks or washers can be used for this purpose. Such apparatus is well known in the art. It is a feature of the present invention that the ring collar mill used for pressing the moistened solids has press channels with a length-to-diameter ratio of 1:1 to 10:1 and a roller gap (spacing) between ring matrix and press roller of 0.05 to 2 mm.

It was found that in a suitable treatment of the powdered solids by moistening and mixing with a mixer and also subsequent pressing in a suitably sized ring collar mill and rounding with a rounding unit with wrinkle washer, spherical granulated materials can be produced that have a very narrow distribution curve of particle diameter (particle size distribution). The average particle diameter of the granules is determined essentially by the diameter of the press channels of the ring matrix and thus can be easily changed by replacement of the ring matrix.

BRIEF DESCRIPTION OF THE DRAWINGS

The present invention will be further understood with reference to the drawings, wherein.

DETAILED DESCRIPTION OF THE INVENTION

Roller compactors and ring collar mills are characterized by much smaller investment costs compared to extruders. Ring collar mills consist of a motor-driven cylindrical hollow roller (ring matrix) with radially positioned press channels. On the inside surface of the ring matrix runs a pressure roller (pug mill or collar) whose outer diameter is less than the inner diameter of the ring matrix. The press roller is positioned eccentrically to the middle axis of the ring matrix. The axial spacing between press roller and ring collar mill can be varied for setting the roller gap or spacing (W) between ring matrix and press roller (collar). Ring matrices and press rollers are turning in the same direction and thus pull the infed bulk material into the roller gap (spacing), compress it and press it through the radial press channels. The resulting compression is determined by the pressure that is needed to push the individual agglomerate strands out of the ring matrix. This pressure can be controlled by the geometry of the press channels by means of their length at a specified diameter.

The press roller can be driven separately. Thus it is possible to set a slip S between ring matrix and press roller. The slip S is defined by the positive difference in the circumferential velocities of ring matrix and press roller divided by the respective higher circumferential velocity:

$$S=(V_1-V_2)/V_1 \text{ with } V_1 \geq V_2.$$

The slip defined in this way will vary between zero and one. By means of a slip different from zero, the material pulled into the roller gap (spacing) is subjected to a greater compressing force in the roller gap (spacing) and is also subjected to shear. Thus we obtain an improved compression and a homogeneous structure of the agglomerates.

With each rotation of the ring matrix, disc-like partial agglomerates are rolled into the holes in the matrix. These combine to form a continuous loop. The strength in the seam between two partial agglomerates is less than in the interior of a partial agglomerate (see Claas-Jurgen Klasen, "The Agglomeration of Particulate Solids in Matrix Presses," Fortschritt-Berichte VDI, series 3: Verfahrenstechnik, No. 220; VDI-Publishing, Dusseldorf 1990).

The agglomerate strands exiting from the ring matrix can be cut off through suitable stripping blades. The cut or uncut cylindrical shaped agglomerates can subsequently be rounded off to granulates in a rounding unit. Changing the product is in general associated with very little effort since a clear separation or shaping of the used material and driving of the ring collar mill permits a fast and thorough cleaning.

The particle size distribution of the finished granulated materials can be determined by means of a sift analysis. The sift analysis provides a total distribution curve for the particle diameter from which the average particle diameter can be read off. It is defined as that diameter value where the total distribution curve has a value of 50% (that is, 50 wt % of the granules have a diameter that is less than the average diameter).

The range of the resulting particle size distribution depends in part on the type of solid to be granulated. In general, mineral solids have a narrower particle size distribution than for example carbon black. But in the case of carbon black, 80 wt % of the granules lie in a diameter interval whose range is less than 60% of the average particle diameter. In the case of mineral materials, this value can fall to below 30% of the average particle diameter. The particle size distribution curves are not necessarily symmetrical to the average particle diameter, but rather can have lesser or greater as asymmetry.

The agglomerate strand exiting from the ring collar mill need not be cut to length by means of a stripping blade. Rather the interfaces between the partial agglomerates are used as set fracture points that lead to a fracture of the agglomerate strands in the rounding unit into the same-size partial agglomerates. A prerequisite for this however, is that the moisture content of the material used and the sizing of the ring collar mill are selected according to the present invention.

In the context of the present invention, the moisture content means the weight fraction of the moistening agent relative to the total weight of the moistened feed material. The optimal moisture content for the granulation method according to the present invention lies up to 20% below the optimum moisture content of conventional granulation methods. In a particular case this can be associated with considerable energy savings when drying the granulated material.

The optimum moisture content depends on the type of solid that is to be granulated, in particular on its pore volume or, in the case of carbon black, on its structure. It can be determined by a few preliminary tests; the techniques necessary for this are known to the person skilled in the art.

In addition to the moistening and binding agents, additional additives can be added to the powdered solids before the granulation process up to a weight fraction of about 20% of the total weight of the mixture. These additives can be for example hydrophobic agents.

The method according to the present invention can be used to particular advantage for the production of spherical granulated materials with diameters of 0.5 to 4 mm. The list of solids that can be processed according to the method includes inorganic oxide materials (silica, zeolites, $TiO_2$), ceramic paints, pigments, solid cyanides, and also laundry compounds, fodders and carbon blacks.

Due to their excellent sphericity, the granules produced according to this method in general have a good flow behavior. The granules are inherently homogeneous since one granule is formed of only one partial agglomerate.

In addition, the compression pressures are very uniform across the entire roller width of the ring collar mill, which leads accordingly to uniformly compressed agglomerate strands. This will result in a constant density of all granules. Their redispersibility is in general very good. For adhesive materials a simple device can be provided in the rounding unit for removing powder from the granules.

Even though the granulation method according to the present invention can be used for many powdery solids, its preferred application will be in the area of granulation of carbon blacks of varying qualities. The method can be applied equally well for granulation of rubber carbon blacks and also pigment carbon blacks. Rubber carbon blacks in general have a DBP absorption of between 60 and 140 mL/100 g (measured according to DIN 53601), an iodine adsorption of less than 150 mg/g (measured according to DIN 53582) and a tamped density between 400 and 550 g/L (measured according to DIN 150707/11); whereas pigment carbon blacks are characterized by a DBP absorption between 40 and 450 mL/100 g, an iodine adsorption between 30 and 1200 mg/g, and a tamped density of between 150 and 500 g/L.

The group of pigment carbon blacks also includes the so-called conductivity carbon blacks that are characterized by particularly high structure and surface which is expressed in the exceptionally high values for DBP absorption and iodine adsorption. For example, the special conductivity carbon black Printex XE2 (Degussa trademark) has a DBP absorption of 380 mL/100 g and an iodine adsorption of 1075 ml/g. These conductivity carbon blacks have been heretofore difficult to subject to granulation and thus are used primarily in powder form. Now it turns out that the granulation method according to the present invention is also a suitable means of granulating these carbon blacks.

An unexpected advantage of the present invention over known wet granulation methods for carbon blacks is the fact that only very little binder has to be added to the carbon blacks. Whereas conventional granulation methods require a binder content of the finished granulated materials of 0.5 to 3 wt %, the method of the present invention can use binder contents of less than 1 wt % and preferably less than 0.5 wt %. For example, molasses or lignin sulfate can be used which are also employed in the conventional granulation method. For applications in which the binders have an adverse effect, granulation without binder is also possible.

The individual pellet hardness of the granules according to DIN 53603, even in the absence of binders, lies in the range between 10 and 50 cN, and the abrasion determined according to DIN 53583 amounts to less than 3 wt %.

In case of granulation of rubber carbon blacks, such as N326, N539, N550, N660 and N683 (designations from ASTM), the attainable stamping densities amount to between 400 and 550 g/L, in particular between 400 and 500 g/L. The dispersed hardness of these carbon blacks, determined according to DIN 53775, Part 7, amounts to less than 5%. The carbon blacks granulated in this manner thus have excellent redispersion properties.

One particular advantage of the granulation method consists in the fact that the granulation process is extremely gentle. The structure and specific surface area of the powdered carbon blacks, measured by their DBP absorption and iodine adsorption, will be reduced by at most only 5% due to the granulation. This property is particularly advantageous for carbon blacks with high structure.

In the following examples of the granulation method according to the present invention, a ring collar mill with press channel diameters of 1 mm and an l/d length to diameter ratio of 5 and also a roller gap (spacing) of 0.2 mm is used. The slip in all cases was equal to zero.

Figure 1:
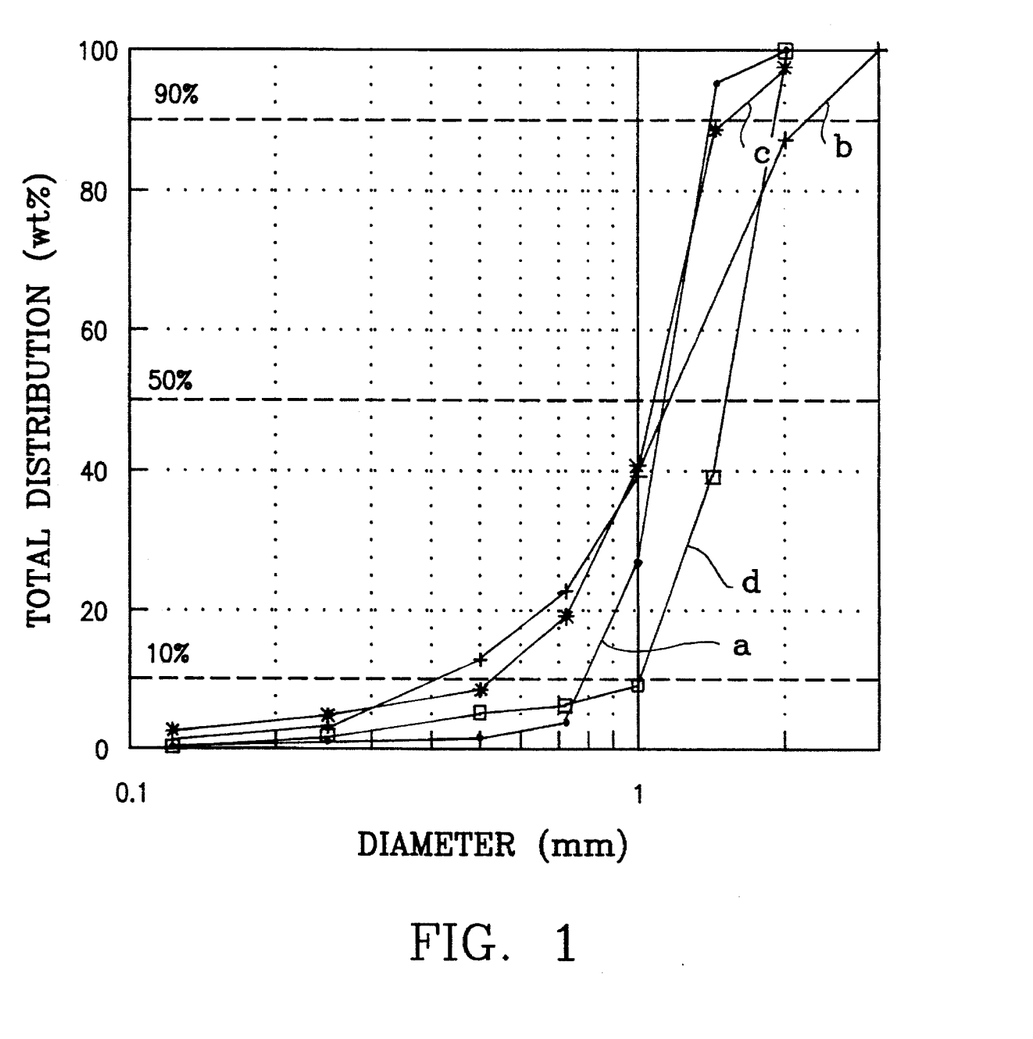
FIG. 1 shows the summary distribution curves obtained from sieve analyses of three granulated materials of one rubber carbon black N550 (according to ASTM) and also the distribution curve of one granulated conductivity carbon black (Printex XE2, Degussa).

FIG. 1 shows the summary distribution curves obtained from sieve analyses of three granulated materials of one rubber carbon black N550 (according to ASTM) and also the distribution curve of one granulated conductivity carbon black (Printex XE2, Degussa). Curve 'a' is the distribution curve of a granulated material obtained according to the present invention. The granulated materials for distribution curves b and c were obtained by conventional decomposition agglomeration with a barbed shaft mixer (curve b) and/or a plowshare mixer (curve c). Curve d is the distribution curve for the granulated conductivity carbon black according to the present invention.

Figure 2:
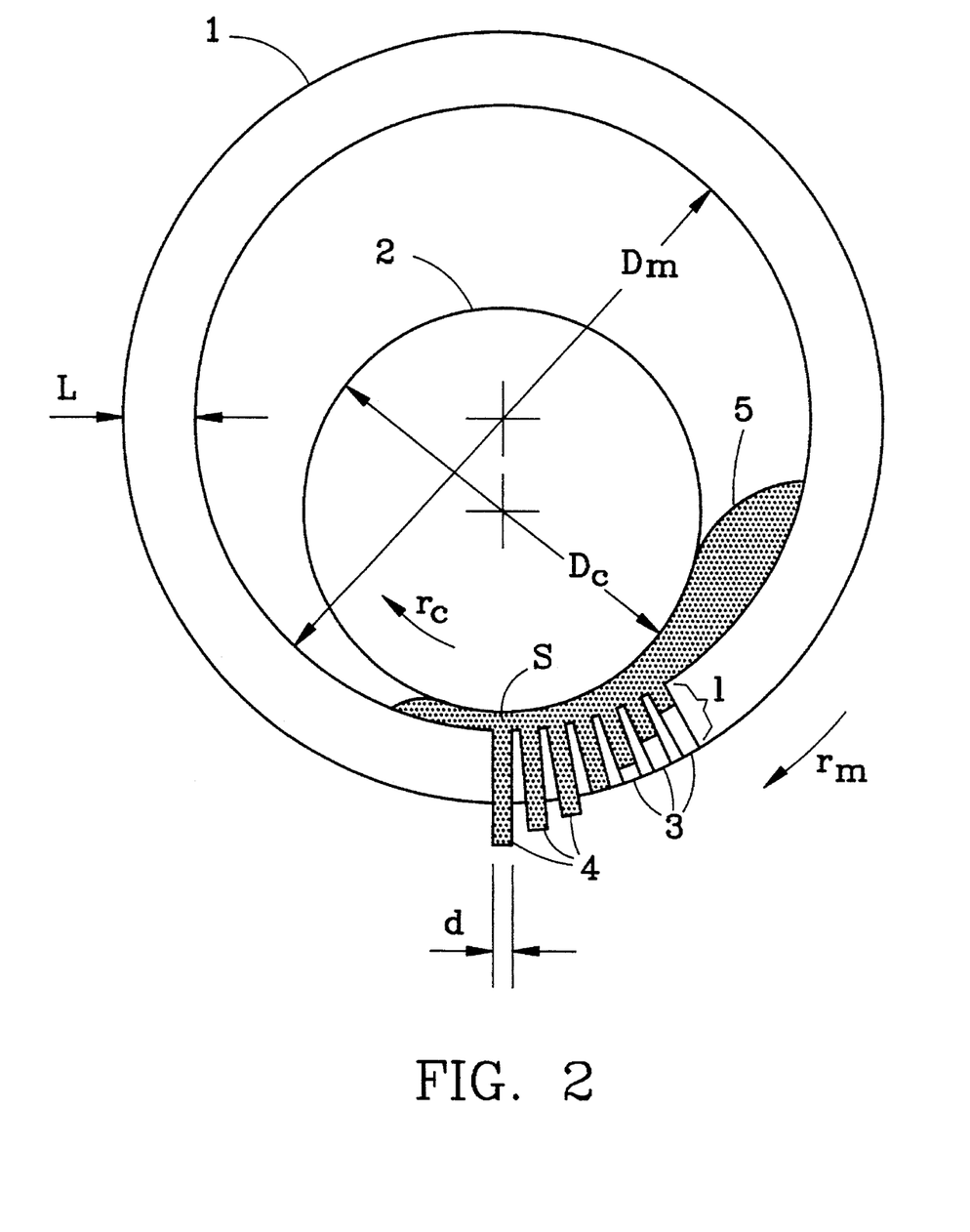
FIG. 2 shows a cross section of the ring collar mill utilized in the method according to the present invention.

FIG. 2 shows a cross section of the ring collar mill utilized in the method according to the present invention. The apparatus comprises a ring matrix or ring die (Matrize) (1) of the ring collar mill, wherein ($D_m$) is the inner diameter of the die ring. The symbol ($r_m$) stands for rotational speed. The direction of rotation of the ring matrix is shown. The ring matrix has a thickness (L) which defines the lengths (l) of the press channels (3). The diameter of the press channels is indicated by (d). Collar (presswalze, Koller)(2) has a diameter (Do) and a rotational speed ($r_c$). The direction of the rotation of the collar is shown by the arrow. Spacing (Walzenspalt)(S) exists between the matrix and the collar. A plurality of press channels (3) are present (only a few are shown for simplicity). Extruded material (4) in different stages of extrusion passes out of the press channels (3). Feed material (5) is introduced in the conventional way. The "Schlupf" (differential speed or backlash between surface of collar and surface of ring matrix at spacing (S) can be varied. The condition for zero backlash is given by the following formula for the rotation speeds:

$$S=(r_c/r_m)/(D_m D_c)$$

Ullmann's Encyclopedia of Industrial Chemistry, Vol. 82, pages 7–15 to 7–21 is incorporated by reference. The ring collar mill utilized in the examples was a PP85 model from Maschinenfabrik H. Schlueter GmbH, Neustadt, Germany.

EXAMPLE 1

Granulation of Rubber Carbon Blacks N550 and N660

Carbon blacks are used in many technical rubber articles as structural enhancers. For an easy handling and processing it is necessary on the one hand to shape the carbon blacks for transport and incorporation, e.g. into rubber, as abrasion-resistant and hard agglomerates, but on the other hand it is necessary that they can be very easily dispersed. The specification values pertaining to the processability of the carbon blacks have the following typical values:
Average particle diameter: 0.5 to 2 mm
Particle size distribution: smallest possible range
Dispersion hardness:<10% (per DIN 53775, Part 7)
Abrasion:<5% (per DIN 53503)

As the following example will show, the method according to the present invention is highly suitable for the production of carbon black granulated materials with properties that represent an optimum compromise between the contradicting practical requirements.

For the granulation of carbon black N550 (according to ASTM) according to the method of the present invention, it was moistened with water to a moisture content of 43% (corresponding to 754 g water to 1 kg of carbon black) and was thoroughly mixed in a mixer. The addition of water is needed in order to reduce the necessary compression forces and also in order to activate the adhesion forces between the particles.

The necessary mixing time amounts to an average of about 4 minutes. Due to the fast-acting mixing tools an intensive mixing without agglomerate formation will take place.

The moistened carbon black was then compressed with a ring collar mill at a speed of the ring matrix of 630 rpm and a specified quantity throughput of 5.5 kg/sec/m² (the specific quantity throughput here is equal to the mass of the compressed powder material per channel surface area and time unit). The agglomerate strands of about 1 to 10 mm length were then rounded off in a rounding unit with wrinkle washer at a speed of 900 rpm for a time of 10 minutes.

After drying of the carbon black granulated material at 150° to 250° C. down to a residual moisture of less than 1%, it was subjected to practical testing. 93% of the granules obtained in this manner had a diameter of between 0.7 and 1.4 mm; the further technical properties are presented in Table I.

Comparison Examples 1a and 1b

For comparison with the carbon black granulated materials according to the method of the present invention, carbon black N550 in powder form was granulated with two additional methods according to the prior art: granulation in a mixer with barbed shaft and in a plowshare mixer. The results of these granulation tests are compared in Table I with those from Example 1.

TABLE I

Comparison of various carbon black agglomeration methods

|  | Example 1 | Comparison Example 1a | Comparison Example 1b |
| --- | --- | --- | --- |
| Method | per invention | barbed shaft | plowshare |
| Moisture | 43% | 45% | 52% |
| Binder | — | 1% lignin sulf. | — |
| Particle size range | 93% between 0.7–1.4 mm | 47% between 0.7–1.4 mm | 75% between 0.7–1.4 mm |
| Abrasion | 0.6% | 0.4% | 3.6% |

As Table I shows, the method according to the present invention will provide spheres with a very narrow particle size distribution. The abrasion lies within the specification and is surpassed only by Comparison Example 1a where carbon black N550 was granulated with 1% lignin sulfonate as binder. Comparison Example 1b without binder has an unacceptably large abrasion. The dispersion hardness of the carbon black spheres of the present invention is surprisingly very low due to the narrow particle distribution and homogeneity.

In the comparison examples a greater water content had to be used to obtain satisfactory granulation results. In the subsequent drying process this resulted in a higher energy consumption than for the method according to the present invention.

EXAMPLE 2

In a second test series the carbon blacks N550, N660 and a conductivity carbon black (Printex XE2 by Degussa) were granulated. For this test series a matrix with compression channel diameters of 1.4 mm and compression channel lengths of 3.6 mm was selected. The roller gap (spacing), like that in Example 1, amounted to 0.2 mm.

Carbon blacks N550 and N660 were granulated according to the method of the present invention and according to two conventional methods with a barbed shaft and with a plowshare mixer, and the obtained granulated materials were compared to each other with respect to individual pellet hardness, abrasion, color intensity and dispersion hardness.

Surprisingly, the conductivity carbon black could only be granulated according to the method of the present invention. Granulation tests with barbed shaft and plowshare mixer did not provide any usable granulated materials.

In the conventional granulation method with barbed shaft and plowshare mixer, 1 wt % of lignin sulfate was added as binder. The method of the present invention was applied without added binder. The results of these measurements are presented in Table II.

TABLE II

Comparison of individual pellet hardness, abrasion, color intensity and dispersion hardness of carbon black granulated materials made of carbon blacks N550, N660 and a conductivity carbon black that were granulated according to three different methods.

|  | N550 | N660 | Conductivity carbon black |
| --- | --- | --- | --- |
| Individual Pellet hardness [cN] (from DIN 53603) |  |  |  |
| per present invention | 20 | 11 | 23 |
| with barbed shaft | 30 | 45 | — |

TABLE II-continued

Comparison of individual pellet hardness, abrasion, color intensity and dispersion hardness of carbon black granulated materials made of carbon blacks N550, N660 and a conductivity carbon black that were granulated according to three different methods.

|  | N550 | N660 | Conductivity carbon black |
|---|---|---|---|
| with plowshare |  |  |  |
| Abrasion [%] |  |  |  |
| (from DIN 53583) |  |  |  |
| per present invention | 1.5 | 0.8 | 0.2 |
| with barbed shaft | 1.9 | 1.9 | — |
| with plowshare | 2.2 | 2 | — |
| Color intensity cold [%] |  |  |  |
| (from DIN 53775) |  |  |  |
| per present invention | 100 | 115 | 96 |
| with barbed shaft | 100 | 100 | — |
| with plowshare | 95 | 90 | — |
| Dispersion hardness [%] |  |  |  |
| (from DIN 53,775) |  |  |  |
| powder | — | — | 26 |
| per present invention | 2 | 3 | 23 |
| with barbed shaft | 3.5 | 12 | — |
| with plowshare | 1.0 | 15 | — |

As Table II shows, the method according to the present invention will provide carbon black granulated materials that do indeed have a smaller—but not always sufficient—individual pellet hardness due to the absence of binder (in comparison to conventional carbon blacks granulated with binder) but whose abrasion and dispersion hardness are unexpectedly superior to the conventional granulated materials.

The color intensities (cold) determined according to DIN 53775 were measured at roller temperatures of 130° C. The values presented in Table II are relative values, related to the color intensity that was obtained with the granulated material granulated with a barbed shaft, multiplied by 100. In the case of the conductivity carbon black, the color intensity was selected as reference quantity; it was obtained from the conductivity carbon black in powder form.

It is surprising that the granulated carbon blacks according to the present invention have a smaller abrasion than conventionally granulated carbon blacks even though the addition of a binder was omitted in the method according to the present invention. This finding is probably explained by the good spherical shape and consistent compression of the granulated materials of the present invention, which leads to a smaller abrasion in spite of the smaller pellet hardness.

The granulated conductivity carbon black was also examined with regard to its particle size distribution. The corresponding total distribution curve is presented in FIG. 1. From the particle size distribution curves of FIG. 1 for the four granulated materials produced in Examples 1 and 2 and also in Comparison Examples 1a and 1b, the average particle diameter and also the 80% diameter interval, which included 80 wt % of the particular granules, were determined. The results are presented in Table III. The 80% interval was determined from the diameters of the distribution curves for the total values from 10 and 90%. It is presented in Table III in percent of the average particle diameter.

TABLE III

|  | Average particle diameter [mm] | 80% diameter interval in % of the average diameter |
|---|---|---|
| Example 1 Carbon black N550 per invention | 1.14 | 43% |
| Comparative Example 1a Carbon black N550 with barbed shaft | 1.16 | 150% |
| Comparative Example 1b Carbon black N550 with plowshare | 1.12 | 84% |
| Example 2 Conductivity carbon black per invention | 1.37 | 59% |

From Table III it is seen that the granulated materials produced according to the present invention have a clearly narrower particle size distribution than the comparison granulated materials. In particular, the granulated material according to the present invention have a much smaller percentage of fines. With regard to the granulated conductivity carbon black from Example 2, the influence of the larger compression channel diameter on the average resultant particle diameter can be seen.

EXAMPLE 3

Granulation of a Laundry Compound

The laundry compound being subjected to granulation consisted of sodium-aluminum silicate and 7% polyacrylate as binder. A complete water saturation of this laundry compound was present at a moisture content of 30%. For compression with the ring collar mill it was moistened to 25% water, corresponding to a degree of water saturation of 0.83. The ring collar mill was operated in these tests at a speed of 200 rpm and at a specific throughput of 10 kg/sec/m². The speed of the rounding unit was 600 rpm.

The rounded agglomerates were dried at a temperature of 150° C. down to a residual moisture of 1% and then characterized with regard to bulk weight, flowability, redispersibility and particle size distribution.

The flowability of the granulated laundry compound was determined by means of the Hosokawa powder tester. In this case a flowability index that can lie between 0 and 100 was determined from four different measured values (gradient, compressibility, spatula angle, uniformity coefficient).

To characterize the redispersibility, the weight fraction of the nondispersed material was determined with particle diameters greater than 56 μm.

The granulated material has a bulk weight of 764 g/L and was characterized by a "very good" Hosokawa flowability (flowability index 100). The average diameter of the granules amounted to 1 mm. About 80% of the granules had a diameter in the interval between 0.85 and 1.15 mm. The granulated material had no particle size fraction at all below 100 μm diameter. The fraction with diameters of less than 250 μm amounted to only 1.3%. The granulated material produced according to the present invention was therefore absolutely free of dust. The redispersion tests produced a fraction of less than 5% of nondispersible detergent with diameters of more than 56 μm.

Comparison Example 3

The laundry compound according to example 3 was granulated by using a standard spray agglomeration method as characterized in Example 3. The spray-granulate has a bulk weight of 500 g/L. Its flowability index of less than 90 was not as good as the granulated material produced according to the present invention, but this Hosokawa value is still classed as "relatively good." 7% of the spray-granulate had particle size fractions of less than 100 μm diameter, thus it had significant dust fractions. The redispersion tests indicated a fraction of about 27% of nondispersible detergent with diameters greater than 56 μm.

These results thus confirm the excellent properties of the laundry compound granulated according to the method according to the present invention compared to the comparison spray granulate.

For the practical value of the detergent, in this case the good flow behavior and also the good dispersability and the low dust fraction (particles with particle diameters of less than 100 μm) are of decisive importance.

EXAMPLE 4

Granulation of Pyrogenic Silica

Pyrogenic silica was formed into spheres according to the method of the present invention. Pyrogenic silica (AEROSIL 300 by Degussa AG) with a BET specific surface area (according to DIN 66132) of 300 m²/g was used. As binders, flow agents and plasticizers, magnesium stearate, methyl cellulose and urea were used according to the formulas in DE 3,912,504.

A mixture of 62.5% pyrogenic silica, 5.8% magnesium stearate, 9.6% methyl cellulose and 22.1% urea was moistened with water to a moisture content of 60%, corresponding to a water saturation of 80%, and compressed with the ring collar mill into agglomerate strands of 10 to 30 mm length, which were subsequently rounded in the rounding unit.

In contrast to the operating parameters in the preceding examples, the ring collar mill was operated at speeds of 200 rpm and the rounding unit at stepped speeds of 100 and 600 rpm. The resultant granulated material was dried at 100° C. and subsequently tempered for one hour at 850° C. The tempered granulated material consisted of 99.4% of $SiO_2$. The bulk weight of the finished granulated material amounted to 450 g/L. 80% of the granules had a spherical diameter between 1.4 and 2.5 mm. The abrasion of the granulated material was determined with the Erweka Co. Friabilator and amounted to only 0.2%. To determine the fracture hardness, drop tests were performed in a drop tube of 3 m height. 50 g of the silica granulated material were tested. No fracture of the granules of any kind was found.

The results are compiled in Table IV and are compared there with those from Comparison Example 4.

Comparison Example 4

In comparison to Example 4, the same formula was extruded by using a LUK 2.5 Extruder. However, the mixture of silica and the stated additives however, had to be moistened to 66%. An extrusion at lower moisture was not possible. The increased moisture content made it impossible to carry out a rounding of the extrudates with the rounding unit. Therefore the extrudates were calcined without further rounding and tempered as in Example 3 and its abrasion and fracture in the drop test were compared with the granulated material of Example 4. Due to the cylindrical shape of the extrudates, they have a greater abrasion and an increased danger of fracture than the spherical granules.

TABLE IV

| | Granulation of pyrogenic silica | |
|---|---|---|
| | Example 3 | Comparison Example 3 |
| Method | per invention | Kneading + extruding |
| Moisture | 60% | 66% |
| Particle size range | 80% between 1.4 and 2.5 mm | No rounding possible |
| Abrasion | 0.2% | 2% |
| Fracture during drop test | 0% | 2% |

With the production of spherical granules from pyrogenic silica according to Example 4, it has now become possible for the first time to shape pyrogenic silica into spheres that can be used with particular advantage as catalyst carriers. They have a smaller abrasion and a reduced susceptibility to fracture during handling compared to the pyrogenic silicas shaped into extrudates or tablets.

Further variations and modifications of the foregoing will be apparent to those skilled in the art and such variations and modifications are attended to be encompassed by the claims that are appended hereto.

What is claimed:

1. A method for the production of spherical granulated material from powdered solids, said method comprising adding a moistening agent and optionally an additive to powdered solids in a mixer, uniformly moistening said solids, mixing and pressing said solids into cylindrical strands with a ring collar mill that has a variable slip between ring matrix and press roller, and shaping to form said spherical granulated material, wherein said ring collar mill has press channels with a length-to-diameter ratio of 1:1 to 10:1 and a roller gap between ring matrix and press roller of 0.05 to 2 mm, wherein said powdered solids are selected from the group consisting of rubber carbon blacks, pigment carbon blacks, and conductivity carbon blacks.

2. The method according to claim 1, wherein said powdered solids contain binder.

3. The method according to claim 1, wherein said variable slip S is determined by the formula:

$$S=(r_c/r_m)/(D_m/D_c)$$

wherein $D_m$ is the inner diameter of said ring matrix, $r_m$ is the rotational speed of said ring matrix, $D_c$ is the diameter of said press roller, and $r_c$ is the rotational speed of said press roller.

4. The method according to claim 1, wherein the structure as measured by DBP absorption and the specific surface area as measured by iodine adsorption of said spherical granulated material is reduced by less than or equal to 5% compared to the DBP absorption and the iodine adsorption of the powdered solids.

5. The method according to claim 1, wherein said powdered solids contain less than 0.5 wt % of binder.

6. The method according to claim 1, wherein said method consists essentially of adding a moistening agent and optionally an additive and optionally a binder to powdered solids in a mixer, uniformly moistening said solids, mixing and pressing said solids into cylindrical strands with a ring collar mill that has a variable slip between ring matrix and press roller, and shaping to form said spherical granulated material, wherein said ring collar mill has press channels with a length-to-diameter ratio of 1:1 to 10:1 and a roller gap between ring matrix and press roller of 0.05 to 2 mm, wherein said powdered solids are selected from the group consisting of rubber carbon blacks, pigment carbon blacks, and conductivity carbon blacks.

7. The method according to claim 1, wherein said spherical granulated material has the following physicochemical properties:
   (a) an average diameter of granules between 0.5 and 4 mm,
   (b) a diameter interval that includes 80 wt % of the granules and whose range is less than 60% of the average particle diameter,
   (c) a content of binders of less than 1 wt %,
   (d) an individual pellet hardness of the granules between 10 and 50 cN, and
   (e) an abrasion of less than 3 wt %.

8. The method according to claim 7, wherein the content of binders is less than 0.5 wt % in said spherical granulated material.

9. The method according to claim 7, wherein said abrasion is less than 1 wt %.

10. The method according to claim 1, wherein said powdered solids are rubber carbon black that have the following properties in powder form:
    (a) a DBP-absorption between 60 and 140 mL/100 g,
    (b) an iodine adsorption of less than 150 mg/g, and
    (c) a tamped density between 400 and 550 g/L,
wherein said granulated material has a tamped density between 400 and 550 g/L, a dispersion hardness of less than 5% and wherein the DBP number and iodine adsorption of said granulated material are reduced by at most 5% compared to the values of the powder form.

11. The method according to claim 10, wherein said tamped density is between 400 and 500 g/L.

12. The method according to claim 7, wherein said powdered solids are pigment carbon blacks that have the following properties in powder form:
    (a) a DBP absorption between 40 and 450 mL/100 g,
    (b) an iodine adsorption between 30 and 1200 mg/g, and
    (c) a tamped density between 150 and 500 g/L,
wherein said granulated material has a tamped density between 180 and 550 g/L and wherein the DBP number and iodine adsorption of said granulated material are reduced only by at most 5% compared to the values of the powder form.

13. A method for the production of spherical granulated material from powdered solids, said method comprising adding a moistening agent and optionally an additive, to powdered solids in a mixer, uniformly moistening said solids, mixing and pressing said solids into cylindrical strands with a ring collar mill that has a variable slip between ring matrix and press roller, and shaping to form said spherical granulated material, wherein said ring collar mill has press channels with a length-to-diameter ratio of 1:1 to 10:1 and a roller gap between ring matrix and press roller of 0.05 to 2 mm, wherein said powdered solids are selected from the group consisting of rubber carbon blacks, pigment carbon blacks, and conductivity carbon blacks; wherein said powdered solids are free of binder.

14. A spherical granulated material comprising powdered solids selected from the group consisting of rubber carbon blacks, pigment carbon blacks, and conductivity carbon blacks, produced by a method comprising adding a moistening agent and optionally an additive, to powdered solids in a mixer, uniformly moistening said solids, mixing and pressing said solids into cylindrical strands with a ring collar mill that has a variable slip between ring matrix and press roller, and shaping to form said spherical granulated material, wherein said ring collar mill has press channels with a length-to-diameter ratio of 1:1 to 10:1 and a roller gap between ring matrix and press roller of 0.05 to 2 mm, wherein said powdered solids are selected from the group consisting of rubber carbon blacks, pigment carbon blacks, and conductivity carbon blacks; wherein said powdered solids are free of binder.

15. A spherical granulated material comprising powdered solids selected from the group consisting of rubber carbon blacks, pigment carbon blacks, and conductivity carbon blacks, produced by a method comprising adding a moistening agent and optionally an additive to powdered solids in a mixer, uniformly moistening said solids, mixing and pressing said solids into cylindrical strands with a ring collar mill that has a variable slip between ring matrix and press roller, and shaping to form said spherical granulated material, wherein said ring collar mill has press channels with a length-to-diameter ratio of 1:1 to 10:1 and a roller gap between ring matrix and press roller of 0.05 to 2 mm, wherein said powdered solids are selected from the group consisting of rubber carbon black, pigment carbon blacks, and conductivity carbon blacks.

16. The spherical granulated material according to claim 15, said material having the following physicochemical properties:
    (a) an average diameter of granules between 0.5 and 4 mm,
    (b) a diameter interval that includes 80 wt % of the granules and whose range is less than 60% of the average particle diameter,
    (c) a content of binders of less than 1 wt %,
    (d) an individual pellet hardness of the granules between 10 and 50 cN, and
    (e) an abrasion of less than 3 wt %.

17. The spherical granulated material according to claim 16, wherein said content of binders is less than 0.5 wt %.

18. The spherical granulated material according to claim 15, wherein said material contains binder.

19. The spherical granulated material according to claim 18, wherein said abrasion is less than 1 wt %.

20. The spherical granulated material according to claim 16 wherein said powdered solids are rubber carbon black that have the following properties in powder form:
    (a) a DBP-absorption between 60 and 140 mL/100 g,
    (b) an iodine adsorption of less than 150 mg/g, and
    (c) a tamped density between 400 and 550 g/L,
wherein said granulated material has a tamped density between 400 and 550 g/L, a dispersion hardness of less than 5% and wherein the DBP absorption and iodine adsorption of said granulated material are reduced by at most 5% compared to the DBP absorption and iodine adsorption of the powder form.

21. The spherical granulated material according to claim 20, wherein said tamped density is between 400 and 500 g/L.

22. The spherical granulated material according to claim 16 wherein said powdered solids are pigment carbon blacks that have the following properties in powder form:
    (a) a DBP absorption between 40 and 450 mL/100 g,
    (b) an iodine adsorption between 30 and 1200 mg/g, and
    (c) a tamped density between 150 and 500 g/L,
wherein said granulated material has a tamped density between 180 and 550 g/L and wherein the DBP adsorption and iodine adsorption of said granulated material are reduced only by at most 5% compared to the DBP adsorption and iodine adsorption of the powder form.

23. The spherical granulated material according to claim 15, consisting essentially of powdered solids selected from the group consisting of rubber carbon blacks, pigment carbon blacks, and conductivity carbon blacks, and optionally an additive and optionally a binder, produced by a method consisting essentially of adding a moistening agent and optionally an additive and optionally a binder to powdered solids in a mixer, uniformly moistening said solids, mixing and pressing said solids into cylindrical strands with a ring collar mill that has a variable slip between ring matrix and press roller, and shaping to form said spherical granulated material, wherein said ring collar mill has press channels with a length-to-diameter ratio of 1:1 to 10:1 and a roller gap between ring matrix and press roller of 0.05 to 2 mm, wherein said powdered solids are selected from the group consisting of rubber carbon blacks, pigment carbon blacks, and conductivity carbon blacks.

* * * * *